(12) United States Patent
Kermani

(10) Patent No.: US 6,411,236 B1
(45) Date of Patent: Jun. 25, 2002

(54) PROGRAMMABLE PRIORITY ENCODER

(75) Inventor: Bahram Ghaffarzadeh Kermani, Whitehall, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/419,522

(22) Filed: Oct. 18, 1999

(51) Int. Cl.[7] ................................................. H03M 1/00
(52) U.S. Cl. ...................................... 341/141; 710/244
(58) Field of Search .............................. 341/55; 326/37, 326/38, 49, 50, 105, 108; 711/150, 158, 168, 167, 169; 710/244, 240, 241

(56) References Cited

U.S. PATENT DOCUMENTS 5,602,764 A * 2/1997 Eskandari-Gharnin et al. .. 364/715.09
6,133,760 A * 10/2000 Benschneider ............... 326/106
6,163,831 A * 12/2000 Kremani ...................... 711/150
6,170,032 B1 * 1/2001 Izzard ......................... 710/244

* cited by examiner

Primary Examiner—Peguy Jeanpierre
Assistant Examiner—Joseph J Lauture
(74) Attorney, Agent, or Firm—Duane Morris LLP

(57) ABSTRACT

A programmable priority encoder having a plurality of request inputs and a corresponding plurality of acknowledge outputs. A configurable priority encoder subunit implements one of a plurality of priority schemes in response to a priority control word corresponding to the priority scheme. The configurable priority encoder subunit acknowledges, on a corresponding one of the acknowledge outputs, a request having a highest priority, in the priority scheme, of all current requests on the plurality of request inputs.

16 Claims, 2 Drawing Sheets

PROGRAMMABLE PRIORITY ENCODER

BACKGROUND OF THE INVENTION

1. Field of the Invention

The present invention relates to priority encoders.

2. Description of the Related Art

Priority encoders are circuits that serve to acknowledge the request having the highest priority from among a plurality of requests arriving as active signals to the encoder via request lines. A request acknowledgment includes enabling a circuit (often a microprocessor) so that the circuit, for example, executes the task corresponding to the request. One or more of several agents or components of a computer system, for example, may simultaneously request permission to use a shared resource such as a random access memory (RAM). The priority encoder operates based on an implicit priority ordering or encoding scheme which defines which of the request inputs has which priority.

Each request line is associated with a given agent and with a given rank. For N request lines corresponding to N agents, there may be, for example, rankings from 1 to N associated with each of the N request lines, where each has a unique ranking. The priority encoder acknowledges one request at a time through acknowledgment lines. These may be respectively coupled to the particular devices making the requests, to let the requesting device know whether or not its request is acknowledged. In some encoders, the acknowledgment lines directly correspond to request lines, and the encoder transmits on the acknowledgment lines the acknowledged request only. In other encoders, the acknowledgment lines provide the binary rank of the acknowledged request.

Priority encoders typically contain a set of logic gates which implements a given priority encoding scheme. The priority scheme is thus hardwired and not easy to change. Priority encoders are typically fabricated as part of an integrated circuit (IC), for example, within a semiconductor chip. Chips are formed in the substrate of a physical wafer, e.g. a silicon wafer. Typically, several chips are formed in each wafer. A wafer is a very thin, flat disc of a given diameter. The manufacturing process consists of operations on the surface and substrate of the wafer to create a number of chips. Once the wafer is completely processed, it is cut up into the individual chips, the size of which depends on the number of components and complexity of each chip. For a given chip and the IC it contains the priority schemes of priority encoders within the IC cannot be changed once the IC has been fabricated.

SUMMARY

In the present invention, a programmable priority encoder having a plurality of request inputs and a corresponding plurality of acknowledge outputs. A configurable priority encoder subunit implements one of a plurality of priority schemes in response to a priority control word corresponding to the priority scheme. The configurable priority encoder subunit acknowledges, on a corresponding one of the acknowledge outputs, a request having a highest priority, in the priority scheme, of all current requests on the plurality of request inputs.

DESCRIPTION OF THE PREFERRED EMBODIMENT

A given priority scheme implemented by a priority encoder may be optimal in some contexts but not in others. Unfortunately, there is no way to change the hard-wired priority scheme of conventional priority encoders. The present invention provides for a programmable priority encoder (PPE) so that the priority scheme can be changed when desired, by software command. In one embodiment, the PPE of the present invention contains a priority control register which may be loaded with a priority control byte or word which changes the priority scheme implemented by the PPE to a new priority scheme corresponding to the new control word.

Figure 1:
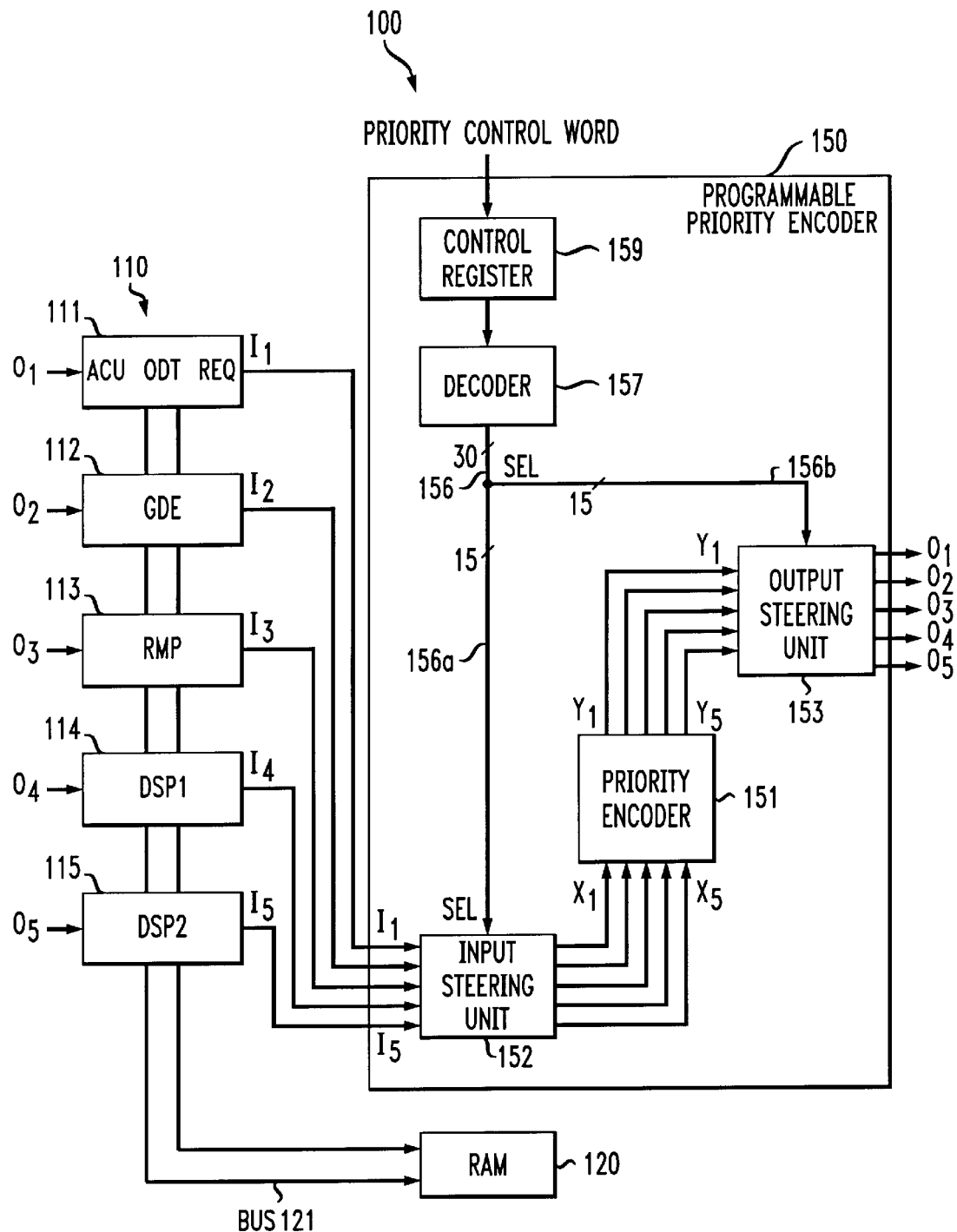
FIG. 1 is a block diagram of a computer system containing a programmable priority encoder, in accordance with an embodiment of the present invention.

Referring now to FIG. 1, there is shown a block diagram of a computer system 100 containing a PPE 150, in accordance with an embodiment of the present invention. The components of system 100 are implemented as part of the same IC, in an embodiment. System 100 contains a plurality of agents or components 110, one of more of which may simultaneously make a request, via a request signal transmitted to PPE 150 at its input terminals or lines $I_1, \ldots, I_5$. In response to at least one active request signal (i.e., in response to at least one request), PPE 150 transmits an acknowledge (output) signal back to only one of the requesting agents, via acknowledge or output lines $O_1, \ldots, O_5$, in accordance with the current priority scheme. Thus, a requesting agent can know whether its request is granted (acknowledged) or not, and take the corresponding requested action (e.g. accessing a shared resource) if so.

Many real-world chips are made for concurrent multi-tasking software schemes. For example, the Lucent™ DSP1691 chip is made for modem and ADSL applications, and contains two digital signal processor (DSP) cores. One of these (DSP1) is used for modem applications and the other (DSP2) is used for ADSL applications, for example. Both of these DSP cores, as well as other agents of a given computer system or IC, access some of the same shared IC or system resources, such as internal and external memories. The external memory interface (EMI), for example, can receive inputs from DSP1, DSP2, and other memory accessing agents. Other memory accessing agents include: an on demand transfer (ODT) engine, which is mainly responsible for downloading code from a PC (personal computer) into the chip; a general DMA (dynamic memory access) engine (GDE); and a resource management port (RMP).

Thus, the agents 110 may be, for example, various components which may wish to utilize a common or shared resource such as a RAM 120 (which may be internal or external memory or the EMI itself). Each of agents 110 may be coupled to shared RAM 120 via a shared bus 121. Agents 110 may include, for example, ODT engine 111, GDE 112, RMP 113, and first and second DSPs 114, 115.

Depending on the application, different priority schemes can be optimal or desired. For example, during an ADSL session or during a fax session using modem functionality, the demands of the engines or agents 110 from RAM 120 may be different. Since the bandwidth of external memory (such as RAM 120 in an embodiment) is often limited, it is important for various agents 110 to access RAM 120 at the order needed. For example, if the user is running an ADSL session, the desired order of access to RAM 120 (i.e., the order of inputs $I_1, \ldots, I_5$ applied to PPE 150) may be, from highest to lowest priority: DSP 115 (for ADSL), DSP 114 (for modem), ODT 111, GDE 112, and RMP 113 (i.e., $I_5, I_4, I_1, I_2, I_3$).

On the other hand, if the system is only running a fax session of the modem DSP 114, a more desirable priority might be: DSP 114, DSP 115, GDE 112, ODT 111, RMP 113 (i.e., $I_4, I_5, I_2, I_1, I_3$). At the very beginning of a program, where most of the code is being downloaded from the PC, a desirable priority order or scheme may be: ODT 111, GDE 112, RMP 113, DSP 114, DSP 115 (i.e., $I_1, I_2, I_3, I_4, I_5$). Thus, since at different times different orders of access to memory 120 are desirable, PPE 150 provides sufficient flexibility and thus can result in a more effective usage of a critical band-limited memory interface or memory device.

PPE 150 receives one input for each possible requesting agent, and outputs an output signal for each of the agents. When at least one of the inputs $I_1, \ldots, I_5$ is active high, indicating a request, then one and only one of the output lines $O_1, \ldots, O_5$ goes active high to indicate which of the requesting agents has the request granted. At any given time, PPE 150 implements a priority scheme or ordering which determines which output line goes high if more than one of the inputs make a simultaneous request.

PPE 150 accomplishes programmable priority encoding by providing a priority control register 159 into which may be loaded a priority control signal or word which specifies (corresponds to) a unique priority scheme or ordering to be implemented by PPE 150. PPE 150 then reconfigures its priority scheme in accordance with this control word.

In one embodiment, PPE 150 contains a priority encoder "subunit" 151 with a fixed (e.g., hardwired) default or nominal priority (ranking) scheme. Input and output steering units 152, 153 and decoder logic 157 serve as a switching or routing network to switch input lines applied to priority encoder subunit 151 to achieve the desired priority ranking. A corresponding switch is also made of the corresponding output lines from priority encoder 151. Input steering unit 152 receives the five request inputs $I_1, \ldots, I_5$ and switches or maps them in accordance with select or control signals received from decoder 157, to provide modified or secondary (subunit) request inputs $X_1, \ldots, X_5$ to the input terminals of fixed priority scheme encoder 151. Decoder 157 controls input steering unit 152 to switch the desired request input lines, in response to the priority control word, so as to change the effective priority scheme implemented by PPE 150. Priority encoder subunit 151 outputs a plurality of subunit acknowledge outputs $Y_1, \ldots, Y_5$ in response to the subunit request inputs $X_1, \ldots, X_5$ applied thereto, in accordance with its fixed priority scheme.

For example, priority encoder 151 may implement a fixed, default priority of $X_1, X_2, X_3, X_4, X_5$. Thus, if request inputs $I_1, \ldots, I_5$ are coupled directly to the corresponding subunit request inputs $X_1, \ldots, X_5$, then PPE 150 implements the same default or nominal priority scheme as priority encoder subunit 151, i.e. $I_1, I_2, I_3, I_4, I_5$. However, if it is desired to implement a different priority scheme, such as $I_2, I_1, I_3, I_4, I_5$, this may be done by making the appropriate switches to the order of request inputs $I_1, \ldots, I_5$ with input steering unit 152. In the foregoing example, inputs $I_1$ and $I_2$ are switched, so that $I_1$ is coupled to $X_2$ and $I_2$ is coupled to $X_1$. In general, whichever of request inputs $I_1, \ldots, I_5$ has the highest priority in the new encoding scheme designated by the priority control word is coupled by input steering unit to subunit request input $X_1$ (or whichever of subunit request inputs $X_1, \ldots, X_5$ has the highest priority in the default priority scheme implemented by priority encoder 151); and so on, so that each request input is mapped or selectively coupled by input steering unit 152 to the proper subunit input terminal of priority encoder subunit 151, i.e. to the subunit input terminal which is associated with the rank which the request input is supposed to have in the new priority scheme.

So that the correct requesting agent receives the proper acknowledge generated for that agent's request, an output steering unit 153 is also used at the output of priority encoder 151 to perform the mirror image of the routing or mapping performed by input steering unit 152, so that subunit acknowledge outputs $Y_1, \ldots, Y_5$ are mapped into acknowledge outputs $O_1, \ldots, O_5$. Thus, input and output steering units 152, 153 may be designed similarly, and each receives the appropriate set of control signals from decoder 157.

Figure 2:
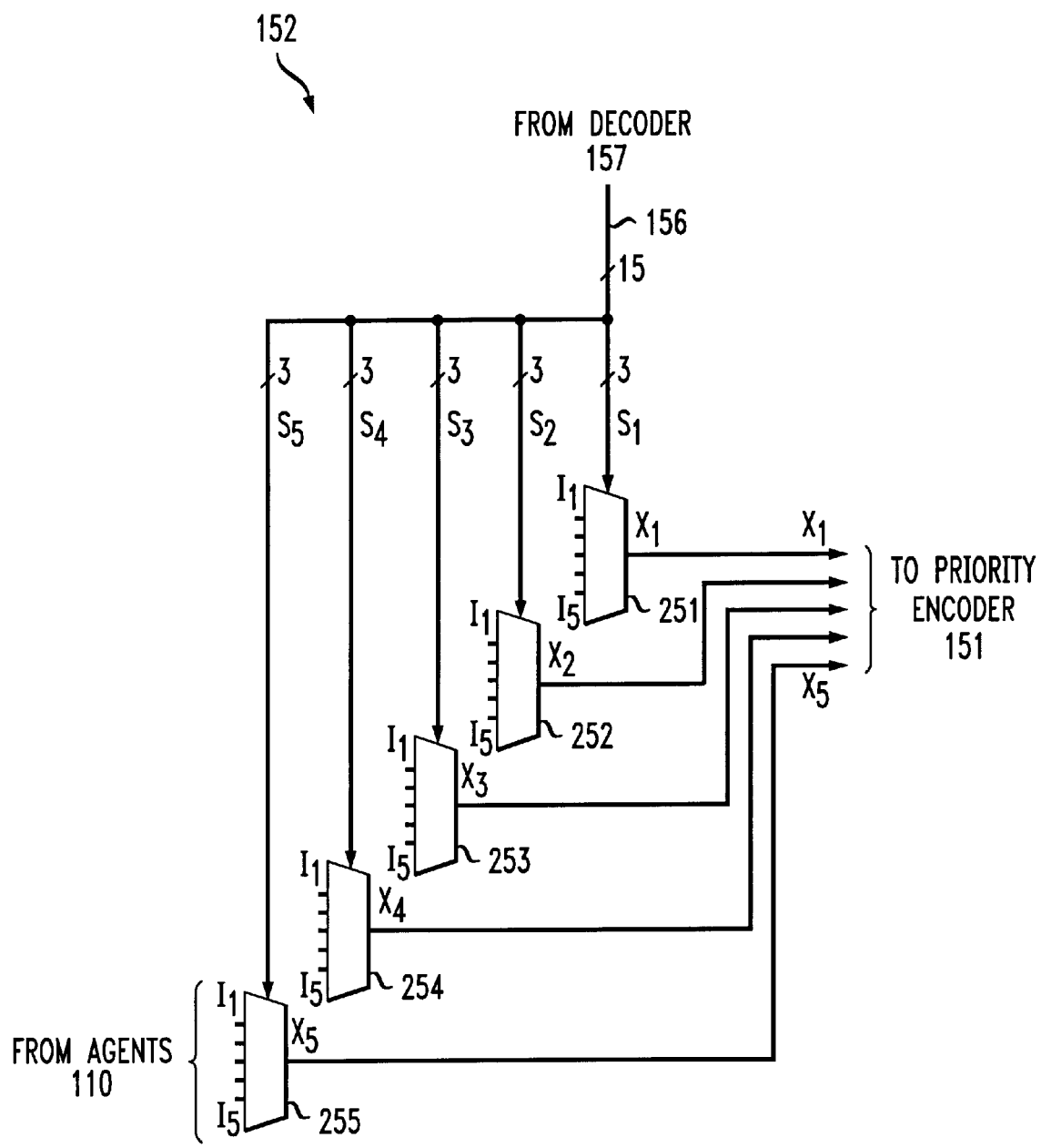
FIG. 2 is a block diagram illustrating the input steering unit of the programmable priority encoder of FIG. 1 in further detail.

In one embodiment, each steering unit 152, 153 may be implemented by using five multiplexers (MUXes) 251–255, i.e. one for each agent and input/output pair, as illustrated in FIG. 2, which shows input steering unit 152 in further detail. Each MUX 251–255 receives all of the request input $I_1, \ldots, I_5$ as inputs, and outputs one of the modified or secondary input signals $X_1, \ldots, X_5$. The particular secondary input signal generated by each MUX of steering unit 152 is equal to a selected one of request inputs $I_1, \ldots, I_5$, and thus routes one of the request inputs $I_1, \ldots, I_5$ through to be the secondary input generated by that MUX. Thus, each MUX is configured based on the set of select signals it receives from decoder logic 157 to select one of the five request inputs $I_1, \ldots, I_5$ to be routed as its output X In this manner, the set of MUXes 251–255 receives the five request inputs $I_1, \ldots, I_5$ and maps or routes them to secondary input signals $X_1, \ldots, X_5$ which are applied to the input of priority encoder 151.

The mapping performed the set of MUXes of a steering unit is done in accordance with control or MUX select signals generated by decoder logic 157, in response to the priority control word. Because, in the illustrative embodiment, each MUX selects one of five inputs, a 3-bit select signal is needed for each MUX. Thus, decoder 157 generates, on line 156, two groups of 15 select bits (30 total), one group on line 156a and the other on line 156b. Each 15-bit select bit group contains 5 groups of 3 bit select signals. For input steering unit 152, the 15 bits on line 156a are separated and applied as 3-bit select signals $S_1, \ldots S_5$ to the select or control inputs of each of MUXes 251–255, respectively. A similar configuration exists for output steering unit 153. In an alternative embodiment, the MUXes of input and output steering units 152, 153 are designed so that they can accept and use the same group of 3-bit select signals $S_1, \ldots S_5$, so that line 156 contains only 15 bits, which is provided to both lines 156a and 156b.

Priority control register 159 may be loaded with a new priority control word at any time by any device having authority to do so. In one embodiment, each of agents 110, and/or a CPU or general processor of the computer system, may load a new control word into register 159, when it is desired to change the priority scheme implemented by PPE 150. In an alternative embodiment, control register 159 is not used. Instead, the priority control word may be received directly from whichever device or agent is generating the priority control word. For example, the priority control word may be received from external pins on the IC containing PPE 150, or directly from one of agents 110.

Decoder logic 157 preferably generates SEL signals such that illegal cases (e.g., cases with similar priorities) are not allowed. In an alternative embodiment, instead of using one control register 159 with decoder logic 157, a separate control register may be used for each MUX of steering units 152, 153, e.g., ten 3-bit control registers in total for the ten MUXes of input and output steering units 152, 153, in the embodiment described above in which line 156 carries 30 select bits. In such an embodiment, instead of one of agents 110 loading a new priority control word into control register 159 which corresponds to the desired priority scheme, the agent desiring a change in priority scheme loads into each of the five control registers for each steering unit the appropriate sub-control words designed to achieve the desired priority scheme. In such an embodiment the set of sub-control words may be considered collectively as an overall priority control word, e.g. a 30-bit control word.

In the embodiment described above, input and output steering units 152, 153 along with priority encoder subunit 151 form a configurable priority control subunit, which implements a priority scheme in accordance with a received control signal or set of control signals. Thus, PPE 150 comprises decoder logic 157, which generates control signals in response to the priority control word, and a configurable priority control subunit which changes or implements a given priority scheme depending upon the control signals received from decoder logic 157. In an alternative embodiment, the configurable priority control subunit comprising input and output steering units 152, 153 and priority encoder subunit 151 may be implemented instead with logic that implements a similar truth table or input/output functions. Thus, in an embodiment, a single configurable priority control subunit is provided which receives the same request signals $I_1, \ldots, I_5$ and outputs the same acknowledge output signal $O_1, \ldots, O_5$, but without necessarily explicitly generating the internal subunit request inputs $X_1, \ldots, X_5$ and subunit acknowledge outputs $Y_1, \ldots, Y_5$.

In the above description, a logic-1 is assumed to be active high and a logic-0 assumed to be active low. In alternative embodiments, logic-0 may represent the active state, as will be appreciated.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A programmable priority encoder having a plurality of request inputs and a corresponding plurality of acknowledge outputs, comprising a configurable priority encoder subunit that implements one of a plurality of priority schemes in response to a priority control word corresponding to the priority scheme, wherein the configurable priority encoder subunit acknowledges, on a corresponding one of the acknowledge outputs, a request having a highest priority, in the priority scheme, of all current requests on the plurality of request inputs, said configurable priority encoder subunit comprising:

a priority encoder subunit having a default priority scheme, a plurality of subunit request inputs, and a plurality of subunit acknowledge outputs; and an input steering unit that maps the plurality of request inputs to the plurality of subunit request inputs, and an output steering unit that maps the plurality of subunit acknowledge outputs to the plurality of acknowledge outputs, in response to the priority control word so that the programmable priority encoder implements the priority scheme.

2. The programmable priority encoder of claim 1, further comprising a control register for receiving and storing the priority control word.

3. The programmable priority encoder of claim 1, further comprising a decoder that generates a plurality of select signals, in response to the priority control word, wherein the configurable priority encoder subunit implements one of a plurality of priority schemes in response to the plurality of select signals.

4. The programmable priority encoder of claim 1, wherein the priority encoder subunit acknowledges, on a corresponding one of the subunit acknowledge outputs, a subunit request having a highest priority, in the default priority scheme, of all current subunit requests on the plurality of subunit request inputs.

5. The programmable priority encoder of claim 1, further comprising a decoder that generates a plurality of select signals, in response to the priority control word, to control the mapping of the input and output steering units.

6. The programmable priority encoder of claim 5, wherein:

the input steering unit comprises a plurality of MUXes, one for each request input, wherein each MUX is coupled at input terminals to all of the request inputs and at an output terminal to a respective one of the subunit request inputs; and the output steering unit comprises a second plurality of MUXes, one for each acknowledge output, wherein each MUX is coupled at input terminals to all of the subunit acknowledge outputs and at an output terminal to a respective one of the acknowledge outputs; and the plurality of select signals generated by the decoder comprise select signals for each MUX.

7. The programmable priority encoder of claim 5, wherein the decoder generates the plurality of select signals, in response to the priority control word, to control the mapping of the input and output steering units such that each of said requests on the plurality of request inputs has a unique priority.

8. The programmable priority encoder of claim 1, wherein the request inputs are received from a plurality of agents of a computer system, wherein a request is a request to access a shared resource of the computer system.

9. The programmable priority encoder of claim 8, wherein the shared resource is a memory of the computer system.

10. The programmable priority encoder of claim 8, wherein the plurality of agents comprise: a first digital signal processor (DSP); a second DSP; an on demand transfer (ODT) engine, which is mainly responsible for downloading code from a PC (personal computer) into the chip; a general DMA (dynamic memory access) engine (GDE); and a resource management port (RMP).

11. The programmable priority encoder of claim 8, wherein the shared resource is an external memory interface used to access an external memory.

12. The programmable priority encoder of claim 1, further comprising a plurality of external pins for receiving the priority control word from an external source.

13. The programmable priority encoder of claim 1, wherein:

the input steering unit comprises a plurality of MUXes, one for each request input, wherein each MUX is coupled at input terminals to all of the request inputs and at an output terminal to a respective one of the subunit request inputs;

the output steering unit comprises a second plurality of MUXes, one for each acknowledge output, wherein each MUX is coupled at input terminals to all of the subunit acknowledge outputs and at an output terminal to a respective one of the acknowledge outputs;

the priority control word comprises a plurality of sub-control words, one for each MUX of the input and output steering units; and each MUX of the input and output steering units comprises a local control register for storing the sub-control word for said each respective MUX.

14. A programmable priority encoder having a plurality of request inputs and a corresponding plurality of acknowledge outputs, comprising a configurable priority encoder subunit, said configurable priority encoder subunit comprising:

priority encoder subunit means having a default priority scheme, a plurality of subunit request inputs, and a plurality of subunit acknowledge outputs;

steering means for mapping the plurality of request inputs to the plurality of subunit request inputs and for mapping the plurality of subunit acknowledge outputs to the plurality of acknowledge outputs, in response to the priority control word so that the programmable priority encoder implements the priority scheme; and means for acknowledging, on a corresponding one of the subunit acknowledge outputs, a subunit request having a highest priority, in the default priority scheme, of all current subunit requests on the plurality of subunit request inputs.

15. The programmable priority encoder of claim 14, further comprising decoder means for generating a plurality of select signals, in response to the priority control word, to control the mapping of the steering means.

16. An integrated circuit having programmable priority encoder having a plurality of request inputs and a corresponding plurality of acknowledge outputs, the programmable priority encoder comprising a configurable priority encoder subunit that implements one of a plurality of priority schemes in response to a priority control word corresponding to the priority scheme, wherein the configurable priority encoder subunit acknowledges, on a corresponding one of the acknowledge outputs, a request having a highest priority, in the priority scheme, of all current requests on the plurality of request inputs, the configurable priority encoder subunit comprising:

a priority encoder subunit having a default priority scheme, a plurality of subunit request inputs, and a plurality of subunit acknowledge outputs; and an input steering unit that maps the plurality of request inputs to the plurality of subunit request inputs, and an output steering unit that maps the plurality of subunit acknowledge outputs to the plurality of acknowledge outputs, in response to the priority control word so that the programmable priority encoder implements the priority scheme, wherein:

the priority encoder subunit acknowledges, on a corresponding one of the subunit acknowledge outputs, a subunit request having a highest priority, in the default priority scheme, of all current subunit requests on the plurality of subunit request inputs; and the programmable priority encoder further comprises a decoder that generates a plurality of select signals, in response to the priority control word, to control the mapping of the input and output steering units.

* * * * *